B. F. Taft,
Hay Press.
N° 80,681. Patented Aug. 4, 1868.
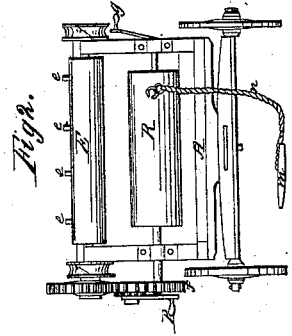
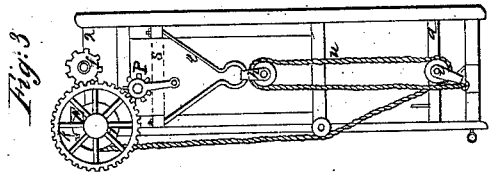
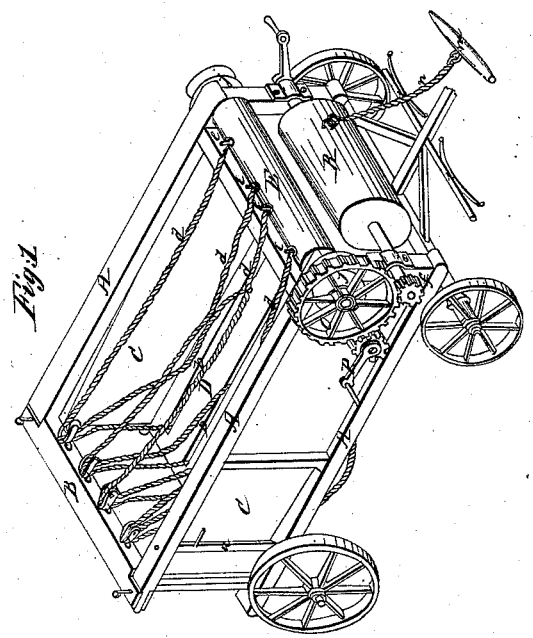
Witnesses.
John W. Kittredge
C. L. Keyes
Inventor.
B. F. Taft

United States Patent Office.

BENJAMIN F. TAFT, OF GROTON JUNCTION, ASSIGNOR TO HIMSELF AND DANIEL NEEDHAM, OF GROTON, MASSACHUSETTS.

Letters Patent No. 80,681, dated August 4, 1868.

IMPROVED HAY AND COTTON-PRESS.

The Schedule referred to in these Letters Patent and making part of the same.

Be it known that I, BENJAMIN F. TAFT, of Groton Junction, in the county of Middlesex, and State of Massachusetts, have invented a new and improved Hay and Cotton-Press; and I do hereby declare that the following is a full and exact description thereof, reference being had to the accompanying drawings, and to the letters of reference marked thereon.

The nature of my invention consists in applying the compressing-power through the agency of nooses in a series of ropes or chains, used for pressing hay, and through the agency of ropes, pulleys, and a follower, for pressing cotton.

To enable those skilled in the art to construct and use my invention, I proceed to describe its construction and operation.

A A A A is the framework of the receiving-box, in the form of a wagon-body, resting on wheels, to facilitate movement from one place to another, as seen in Figure 1. B is the cross-bar, at the rear end of the frame. C C are side boards, loose at the rear end of the receiving-box, to admit of compression inward by the cams $a\ a$, one of which only is seen in the drawing. D is the floor, containing slots, $b\ b\ b\ b$, for the admission of the ropes or chains $d\ d\ d\ d$. E is a drum or roller, in which are inserted pins, $e\ e\ e\ e$, to which the ends of the ropes $d\ d\ d\ d$ are attached. O is a cog-wheel, on the end of the spindle of the roller E. P is a crank and pinion, playing into the teeth of the cog-wheel O. $j\ j$ are pulleys, fixed to the spindle of the roller E. R is an adjustable roller, on the end of the spindle of which is a pinion, $f$, to play into the teeth of the wheel O. $g$ is a crank, fixed at the other end of the spindle of the roller R. $n$ is a slack rope, attached to the roller R, at the other end of which is a whiffle-tree, $m$, to be used when the apparatus is operated by horse-power. $e\ e\ e\ e$ are points, to which the ropes $d\ d\ d$ are attached, and $c\ c\ c\ c$ are pulleys, over which the said ropes pass. $u\ u$ are ropes or chains, on each side of the receiving-box, one of which is seen in Figure 3, one end of which ropes is attached to the tail-board $x$, near the pulleys $i\ i$, and thence the ropes pass over the pulleys $h\ h$, the pulleys $i\ i$, and the pulleys $v\ v$, and are confined at the other end to the pins $k\ k$ on the pulleys $j\ j$. S is the follower, passing down the inside of the receiving-box, when the press is used for pressing cotton. $t$ is a triangular staple, firmly fastened to the follower S, to which the pulley $h$ is attached.

Having described the construction of my improved press, I now proceed to set forth its operation.

To prepare for the reception of hay or other material to be pressed, the ropes $d\ d\ d\ d$ are unreeved from the pulleys $c\ c\ c\ c$, and released from the pins $e\ e\ e\ e$. They are then straightened out, and each is allowed to drop through its corresponding slot in the bottom of the receiving-box, the ends all resting over the roller E. The hay or other material to be pressed being then placed in the receiving-box, the ropes $d\ d\ d\ d$ are reeved through the pulleys $c\ c\ c\ c$, and fastened to the pins $e\ e\ e\ e$, as seen in fig. 1, thus forming nooses around the hay or other material to be pressed. The nooses are then drawn up by hand-power applied to the crank, P, singly, or in combination with crank $g$, as may be required, thus coiling on roller E, which is to revolve until sufficient pressure shall have been applied to the material being pressed. Then wires or ropes for binding the compressed bale may be passed around it, the slots $b\ b\ b\ b$ facilitating that operation, by affording space for the application of wires or ropes underneath the bale. In order to compress the bale in the rear end of it while being packed, the ends of the side boards C C are deflected inwards by means of the cams $a\ a$. When the bale is pressed and bound by wires and ropes, and in fit condition to be removed from the receiving-box, the cams may be reversed, and thereby relieve their pressure upon the ends of the side boards C C.

If horse-power is desired to be used for the operation of pressing, the slack rope $n$ may be wound around the roller R, the pinion $f$ put in connection with the wheel O, and the power applied.

In order to use my improved press for pressing cotton, I use the device exhibited in fig. 3, the side view there representing the receiving-box in an upright position. I first put in the sack or covering for the bale to be bound. I then fill the receiving-box with the cotton to be pressed, turn in the ends of the side boards C C by the cams $a\ a$, apply the power by hand or horse-power, as before described, which causes the follower S to descend or be crowded toward the closed tail-board $x$ until the bale is sufficiently pressed for binding or packing. The bale is then relieved by reversing the cams $a\ a$, as in pressing hay.

Having described the construction and operation of my said invention, what I claim, and desire to secure by Letters Patent, is—

The within-described portable pressing-apparatus, consisting of the mounted wagon-body A S C D, windlasses E and R, with their connecting-gear, ropes, or chains $d\ d\ d\ d$, &c., pulleys $e\ e\ e\ e$, $h$, and $i$, follower S, and cam $a$, all constructed and arranged together substantially as herein shown and described.

B. F. TAFT.

Witnesses:
    JOHN W. KETTREDGE,
    C. L. KEYES.